United States Patent
Watanabe et al.

(10) Patent No.: US 10,851,876 B2
(45) Date of Patent: Dec. 1, 2020

(54) TENSIONER

(71) Applicant: TSUBAKIMOTO CHAIN CO., Osaka (JP)

(72) Inventors: Masanori Watanabe, Osaka (JP); Yudai Takagi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 353 days.

(21) Appl. No.: 15/919,562

(22) Filed: Mar. 13, 2018

(65) Prior Publication Data

US 2018/0274637 A1  Sep. 27, 2018

(30) Foreign Application Priority Data

Mar. 21, 2017  (JP) .................................. 2017-054345

(51) Int. Cl.
*F16H 7/08*  (2006.01)
*F16K 17/20*  (2006.01)

(52) U.S. Cl.
CPC ........... *F16H 7/0848* (2013.01); *F16K 17/20* (2013.01); *F16H 2007/0812* (2013.01);
(Continued)

(58) Field of Classification Search
CPC ........... F16H 7/0848; F16H 2007/0859; F16H 2007/0812; F16H 2007/0893;
(Continued)

(56) References Cited

U.S. PATENT DOCUMENTS 5,087,225 A * 2/1992 Futami ...................... F16H 7/08
474/110
5,637,047 A * 6/1997 Schulze ................ F16H 7/0848
474/110
(Continued)

FOREIGN PATENT DOCUMENTS

JP  2001-12569 A  1/2001
JP  2003-206999 A  7/2003
(Continued)

OTHER PUBLICATIONS

Office Action dated Nov. 28, 2019, issued in counterpart KR Application No. 10-2018-0026320, with English translation (7 pages).

*Primary Examiner* — Michael R Mansen
*Assistant Examiner* — Raveen J Dias
(74) *Attorney, Agent, or Firm* — Westerman, Hattori, Daniels & Adrian, LLP (57) ABSTRACT

A tensioner capable of keeping oil pressure in an oil pressure chamber stable is provided. In the tensioner, a flow amount control mechanism includes a flow amount control member set inside a control space so as to be able to approach and separate from the oil pressure chamber, a control biasing unit, a first restricting part and a second restricting part. The flow amount control member and the inner wall of the control space are provided such that the flow resistance of a first control flow passage, which is exhibited when the flow amount control member contacts the first restricting part, is larger than the flow resistance of a second control flow passage, which is exhibited when the flow amount control member contacts the second restricting part.

4 Claims, 8 Drawing Sheets

(52) U.S. Cl.
CPC ............... *F16H 2007/0859* (2013.01); *F16H 2007/0872* (2013.01); *F16H 2007/0893* (2013.01); *F16H 2007/0897* (2013.01)

(58) Field of Classification Search
CPC ..... F16H 2007/0895; F16H 2007/0897; F16H 2007/0889; F16H 7/08; F16H 2007/0806; F16H 2007/0808; F16H 2007/0829; F16H 7/0834; F16H 7/0836
See application file for complete search history.

(56) References Cited

U.S. PATENT DOCUMENTS

| | | | | |
|---|---|---|---|---|
| 5,658,212 | A | * | 8/1997 | Meurer ................ F16H 7/0838 474/110 |
| 5,700,213 | A | * | 12/1997 | Simpson ............... F16H 7/0848 474/110 |
| 5,833,220 | A | * | 11/1998 | Nakakubo ................ F16H 7/08 267/226 |
| 6,398,682 | B1 | | 6/2002 | Suzuki et al. |
| 6,471,611 | B1 | * | 10/2002 | Hotta .................... F16H 7/1236 474/109 |
| 2001/0007841 | A1 | * | 7/2001 | Nakakubo ............ F16H 7/0836 474/110 |
| 2003/0070717 | A1 | * | 4/2003 | Hashimoto ........... F16H 7/0848 137/825 |
| 2003/0134703 | A1 | | 7/2003 | Saitoh et al. |
| 2003/0186765 | A1 | | 10/2003 | Konishi et al. |
| 2009/0197721 | A1 | * | 8/2009 | Emizu ................... F16H 7/0848 474/110 |
| 2009/0197722 | A1 | * | 8/2009 | Emizu ................... F16H 7/0836 474/110 |
| 2011/0237370 | A1 | * | 9/2011 | Hartmann ............. F16H 7/0836 474/110 |
| 2012/0252616 | A1 | * | 10/2012 | Tawarada .............. F15B 21/044 474/110 |
| 2015/0024887 | A1 | * | 1/2015 | Oh ........................... F16H 7/08 474/110 |
| 2015/0240918 | A1 | * | 8/2015 | Emizu ....................... F16H 7/08 474/110 |
| 2016/0025238 | A1 | | 1/2016 | Miura |
| 2016/0290447 | A1 | * | 10/2016 | Kunimatsu ............. F16K 17/02 |
| 2017/0138444 | A1 | * | 5/2017 | Kurematsu ........... F16H 7/0848 |
| 2018/0066732 | A1 | * | 3/2018 | Michel ...................... F16H 7/08 |
| 2018/0259044 | A1 | * | 9/2018 | Ness ...................... F16H 7/0848 |
| 2018/0363739 | A1 | * | 12/2018 | Hartmann ................. F16H 7/08 |
| 2019/0003557 | A1 | * | 1/2019 | Cobb .................. F16K 27/0209 |
| 2019/0257390 | A1 | * | 8/2019 | Watanabe ............. F16H 7/0848 |
| 2019/0277370 | A1 | * | 9/2019 | Iwasaki ..................... F16H 7/08 |

FOREIGN PATENT DOCUMENTS

| | | |
|---|---|---|
| JP | 2003-278859 A | 10/2003 |
| JP | 6028771 B2 | 11/2016 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism uses a tensioner to bias a tensioner lever for slidably guiding a drive chain, such as an endless roller chain passing over respective sprockets of a crankshaft and a cam shaft inside an engine room, to maintain appropriate tension of the chain or the like.

One known tensioner used in such a chain guide mechanism includes: a plunger having a plunger hole that is open on a rear side; a housing having a plunger accommodating hole that is open on a front side for accommodating the plunger; biasing means accommodated inside an oil pressure chamber formed between the plunger accommodating hole and a rear end of the plunger so as to be able to expand and contract and to urge the plunger toward the front side; an oil supply passage for supplying oil from outside the housing into the oil pressure chamber; and a check valve that allows oil to flow from the oil supply passage into the oil pressure chamber and prevents the oil from flowing out from the oil pressure chamber to the oil supply passage (see, for example, Japanese Patent Application Laid-open No. 2001-12569).

SUMMARY OF THE INVENTION

In this tensioner, however, when the engine rotates at high speed, the amount of oil supplied from a hydraulic power source such as an oil pump is increased and sometimes the supplied oil is fed into the oil pressure chamber excessively via the check valve. The oil pressure in the oil pressure chamber then becomes too high, causing the plunger to protrude toward the tensioner lever more than necessary. As the drive chain or the like is pressed too much, this causes problems such as noise generation, or shortening of the life of the drive chain.

As one solution to the problem above, it is conceivable to provide a relief valve mechanism that releases oil from the oil pressure chamber to the outside of the plunger when the oil pressure inside the oil pressure chamber rises (see, for example, Japanese Patent Application Laid-open No. 2001-12569).

With the relief valve mechanism of Japanese Patent Application Laid-open No. 2001-12569, when the oil pressure in the oil pressure chamber rises, part of the oil supplied from the hydraulic power source such as an oil pump is released to the outside. This increases oil consumption and requires higher power from the hydraulic power source.

As another solution to the problem described above, it has been known to form an excess oil discharge passage in the housing in communication with the oil supply passage to release an excess of oil to the outside of the tensioner. When too much oil is supplied from the hydraulic power source, part of the oil is released from the excess oil discharge passage to prevent excessive supply of oil into the oil pressure chamber (see, for example, Japanese Patent Application Laid-open No. 2003-206999).

The tensioner of Japanese Patent Application Laid-open No. 2003-206999 requires an excess oil discharge passage to be formed in the housing. This not only causes an increase in the production cost, but also, similarly to the invention according to Japanese Patent Application Laid-open No. 2001-12569, increases oil consumption and requires higher power from the hydraulic power source, because part of oil supplied from the hydraulic power source is released to the outside of the tensioner from the excess oil discharge passage.

The present invention solves these problems and it is an object of the invention to provide a tensioner that can keep the oil pressure inside an oil pressure chamber stable with a simple structure.

The present invention solves the problems described above by providing a tensioner including: a plunger having a plunger hole that is open on a rear side; a housing having a plunger accommodating hole that is open on a front side for accommodating the plunger; a main biasing unit that is accommodated inside an oil pressure chamber formed between the plunger accommodating hole and a rear end of the plunger so as to be able to expand and contract and to urge the plunger toward the front side; an oil supply passage that supplies oil from outside the housing into the oil pressure chamber; a check valve that allows oil to flow from the oil supply passage into the oil pressure chamber and prevents the oil from flowing out from the oil pressure chamber to the oil supply passage; and a flow amount control mechanism set at a position further toward the oil supply passage than the check valve. The flow amount control mechanism includes a flow amount control member set inside a control space formed at the position further toward the oil supply passage than the check valve so as to be able to approach and separate from the oil pressure chamber, a control biasing unit that urges the flow amount control member toward the oil supply passage, a first restricting part that restricts movement of the flow amount control member toward the oil pressure chamber, and a second restricting part that restricts movement of the flow amount control member toward the oil supply passage. When the flow amount control member contacts the first restricting part, a first control flow passage is formed between the flow amount control member and an inner wall of the control space so that the oil is allowed to flow between the control space and the oil pressure chamber. When the flow amount control member contacts the second restricting part, a second control flow passage is formed between the flow amount control member and an inner wall of the control space so that the oil is allowed to flow between the oil supply passage and the control space. The flow amount control member and the inner wall of the control space are provided such that the first control flow passage has a larger flow resistance than the second control flow passage.

According to one aspect of the present invention, the flow amount control mechanism set at a position further toward the oil supply passage than the check valve includes a flow amount control member set inside a control space formed at the position further toward the oil supply passage than the check valve so as to be able to approach and separate from the oil pressure chamber, a control biasing unit that urges the flow amount control member toward the oil supply passage, a first restricting part that restricts movement of the flow amount control member toward the oil pressure chamber, and a second restricting part that restricts movement of the flow amount control member toward the oil supply passage.

When the flow amount control member contacts the first restricting part, a first control flow passage is formed between the flow amount control member and an inner wall of the control space for the oil to flow between the control space and the oil pressure chamber. When the flow amount control member contacts the second restricting part, a second control flow passage is formed between the flow amount control member and an inner wall of the control space for the oil to flow between the oil supply passage and the control space. The flow amount control member and the inner wall of the control space are provided such that the first control flow passage has a larger flow resistance than the second control flow passage.

This way, while a sufficient amount of oil is supplied to the oil pressure chamber through the second control flow passage having a relatively smaller flow resistance in normal operation, when the amount of supplied oil is increased due to high-speed rotation of the engine or the like, the flow amount control member is moved toward the oil pressure chamber by the oil pressure, so that the amount of oil supplied to the oil pressure chamber can be controlled by the first control flow passage having a relatively large flow resistance. Thus the oil pressure inside the oil pressure chamber can be made stable with a simple structure.

Moreover, since release of part of the oil to the outside as practiced in conventional tensioners can be avoided, the oil consumption can be reduced, which enables a reduction in size of the hydraulic power source.

According to another aspect of the present invention, the check valve is used as part of the inner wall of the control space, so that the structure is simplified. Moreover, since the check valve can be processed more easily than the housing, the inner wall of the control space can be formed precisely without increasing the production cost, to achieve favorable control of the amount of oil supplied to the oil pressure chamber.

According to another aspect of the present invention, the flow amount control member includes a restricted surface that abuts on a restricting wall surface serving as the first restricting part when the first restricting part restricts movement of the flow amount control member toward the oil pressure chamber. A first communication groove is formed on the restricted surface. Therefore, when the flow amount control member is restricted from moving toward the oil pressure chamber, its restricted surface is contacted to the first restricting part to control the posture of the flow amount control member favorably on one hand, while, on the other hand, the oil can flow between the control space and the oil pressure chamber through the first communication groove.

According to another aspect of the present, invention, the flow amount control member includes a small-diameter part formed on the restricted surface. As a result, the small-diameter part of the flow amount control member is inserted into the oil hole of the first, restricting part, when the first restricting part restricts movement of the flow amount control member toward the oil pressure chamber, and the flow amount control member is kept in a stable posture. Moreover, the gap between the small-diameter part of the flow amount control member and the connection hole of the first restricting part can be utilized as the first control flow passage.

According to another aspect of the present invention, the flow amount control member includes a base part having the restricted surface, and a large-diameter part formed on the base part side facing the oil supply passage and having a larger diameter than the base part. One end of the control spring is set on a side face of the large-diameter part on the side facing the oil pressure chamber. This way, the flow amount control member and control spring are set inside the control space stably.

DESCRIPTION OF THE PREFERRED EMBODIMENTS

A tensioner 10 according to a first embodiment of the present invention will be described with reference to the drawings.

Figure 1:
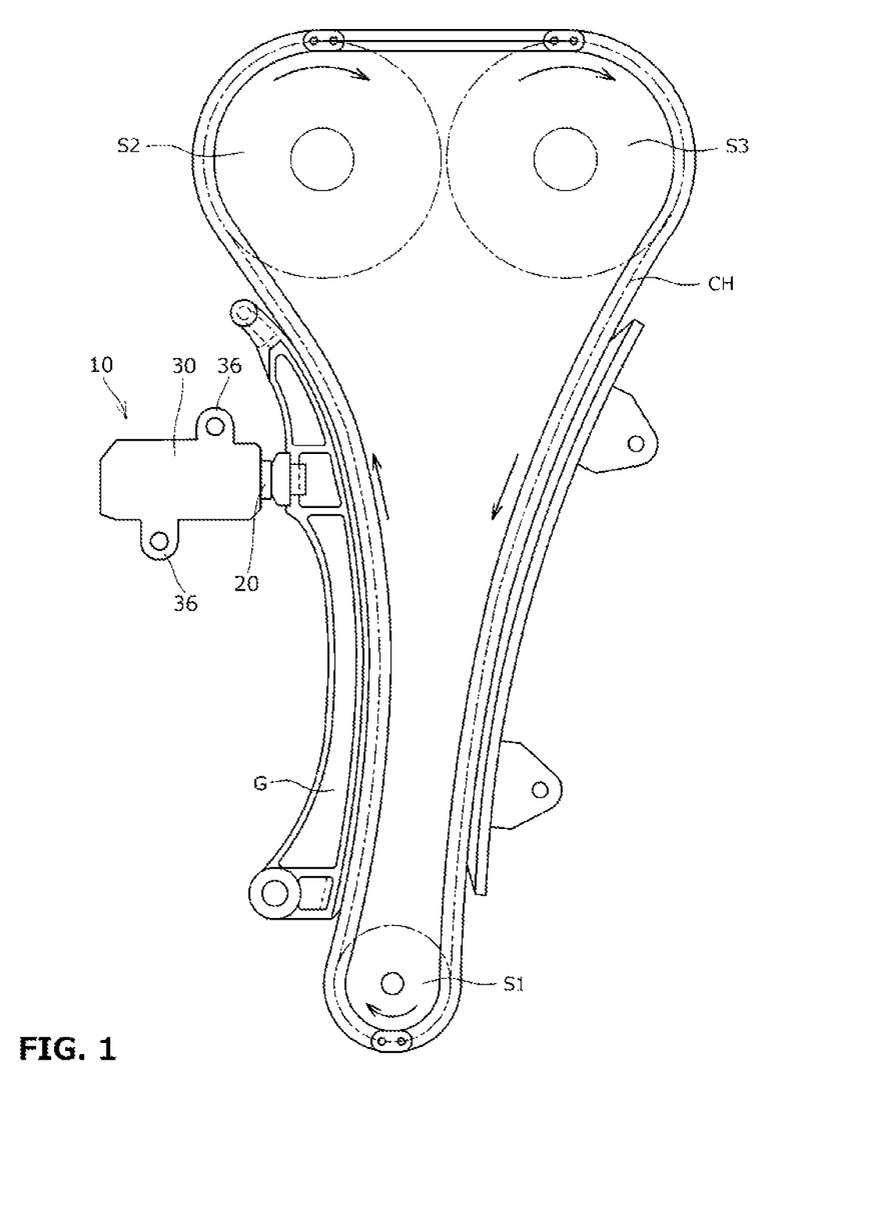
FIG. 1 is an illustrative diagram illustrating a timing system in which a tensioner according to a first embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
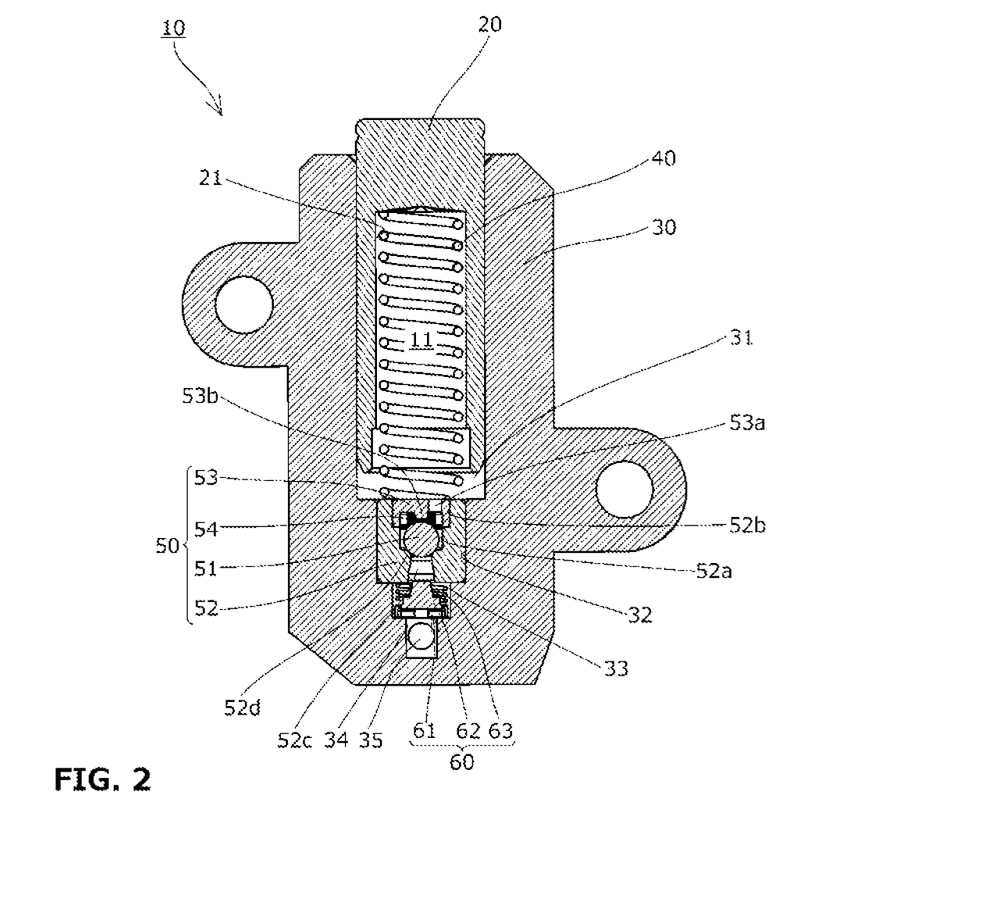
FIG. 2 is a cross-sectional view illustrating the tensioner.

The tensioner 10 includes, as shown in FIG. 2, a plunger 20 having a plunger hole 21 that is open on a rear side, a housing 30 having a plunger accommodating hole 31 that is open on a front side for accommodating the plunger 20, a main spring (main biasing unit) 40 accommodated inside an oil pressure chamber 11 that is formed between the plunger 20 and the plunger accommodating hole 31 so as to be able to expand and contract and to urge the plunger 20 toward the front side, a check valve 50, and a flow amount control mechanism 60 that is set at a position further toward an oil supply passage 35 than the check valve 50.

Hereinafter, various constituent elements of the tensioner 10 will be described with reference to the drawings.

First, the plunger 20 is made of metal such as iron and inserted in the plunger accommodating hole 31 so as to be able to move back and forth in the front to back direction, as shown in FIG. 2.

The housing 30 is made of metal and the like and includes, as shown in FIG. 2, the cylindrical plunger accommodating hole 31 open on the front side, a cylindrical valve accommodating hole 32 formed continuously on the rear side of the plunger accommodating hole 31 and having a smaller diameter than the plunger accommodating hole 31, a cylindrical setting hole 33 formed continuously on the rear side of the valve accommodating hole 32 and having a smaller diameter than the valve accommodating hole 32, a cylindrical connection hole 34 formed continuously on the rear side of the setting hole 33 and having a smaller diameter than the setting hole 33, an oil supply passage 35 extending from outside the housing 30 through to the connection hole 34 in the form of a hole for supplying oil from outside of the housing 30 into the oil pressure chamber 11, and a mounting part 36 used for fixing the housing 30 to the engine block.

The main spring 40 has one end abutting on the bottom of the plunger hole 21 (front side portion of the plunger 20) and the other end arranged in contact with the check valve 50 (ball seat 52 and retainer 53) as shown in FIG. 2.

The check valve 50 allows the oil to flow into the oil pressure chamber 11, and stops the oil from flowing out of the oil pressure chamber 11. As shown in FIG. 2, the check valve is disposed inside the valve accommodating hole 32.

As shown in FIG. 2, the check valve 50 is made up of a spherical check ball 51, a ball seat 52 having a check ball holding part 52a that is open on the side facing the oil pressure chamber 11 (front side in this embodiment), a retainer 53 that restricts the movement of the check ball 51, and a ball spring 54 disposed between the check ball 51 and the retainer 53. These components of the check valve 50 are made of metal, synthetic resin, or the like.

The ball seat 52 is press-fitted into the valve accommodating hole 32 of the housing 30 and thus fixed to the housing 30, as shown in FIG. 2. The ball seat 52 may be fixed to the housing 30 by other means than press-fitting. The ball seat 52 includes, the check ball holding part 52a, a retainer receiving recess 52b formed continuously on the front side of the check ball holding part 52a, and an oil hole 52c that extends from the check ball holding part 52a to the rear side of the ball seat 52.

The retainer receiving recess 52b has a larger diameter than that of the check ball holding part 52a as shown in FIG. 2, while the oil hole 52c has a smaller diameter than that of the check ball holding part 52a. The step between the check ball holding part 52a and the oil hole 52c (bottom of the check ball holding part 52a) functions as a ball seat part 52d for the check ball 51 to sit on in annular tight contact therewith.

The retainer 53 is press-fitted in the retainer receiving recess 52b, as shown in FIG. 2. The retainer 53 has a plurality of oil holes 53a that extend through in the front to back direction, and a spring support part 53b that protrudes from the rear face of a top plate of the retainer 53 toward the rear side.

The ball spring 54 is arranged to fit around the spring support part 53b as shown in FIG. 2 and urges the check ball 51 toward the ball seat part 52d. This ball spring 54 is not an essential constituent element and may be omitted depending on the embodiment.

Figure 3:
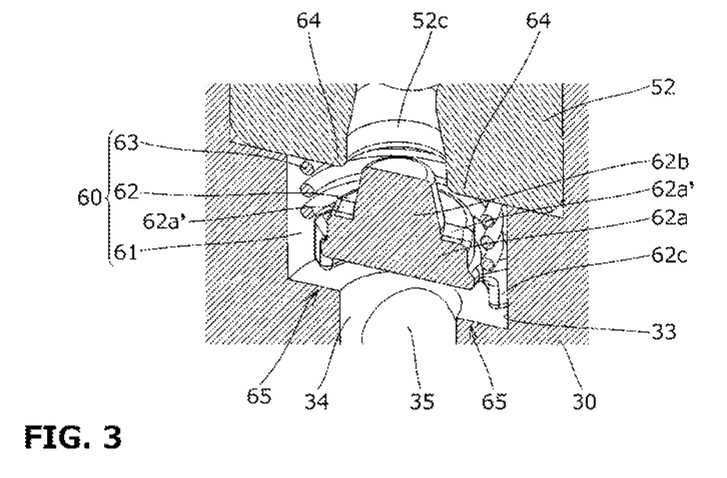
FIG. 3 is a cross-sectional, perspective view illustrating a flow amount control mechanism.

The flow amount control mechanism 60 includes, as shown in FIG. 2 and FIG. 3, a flow amount control member 62 set inside a control space 61 formed on at a position further toward the oil supply passage 35 than the check valve 50 so as to be able to approach and separate from the oil pressure chamber 11 (so as to be movable in the front to back direction), a control spring (control biasing unit) 63 that urges the flow amount control member 62 toward the oil supply passage 35, a first restricting part 64 that restricts movement of the flow amount control member 62 toward the oil pressure chamber 11, and a second restricting part 65 that restricts movement of the flow amount control member 62 toward the oil supply passage 35.

The control space 61 is formed on the check valve 50 side facing the oil supply passage 35 as shown in FIG. 2 and FIG. 3 for the flow amount control member 62 and control spring 63 to be set in. In this embodiment, the inner wall of the control space 61 is formed by the inner circumferential wall and rear end wall of the setting hole 33 (stepped portion between the setting hole 33 and the connection hole 34) in the housing 30, and a rear portion of the check valve 50 (ball seat 52).

In this embodiment, the first restricting part 64 that restricts movement of the flow amount control member 62 toward the oil pressure chamber 11 is formed by a rear portion of the check valve 50 (ball seat 52), and the second restricting part 65 that restricts movement of the flow amount control member 62 toward the oil supply passage 35 is formed by the rear end wall of the setting hole 33 of the housing 30.

Figure 4A:
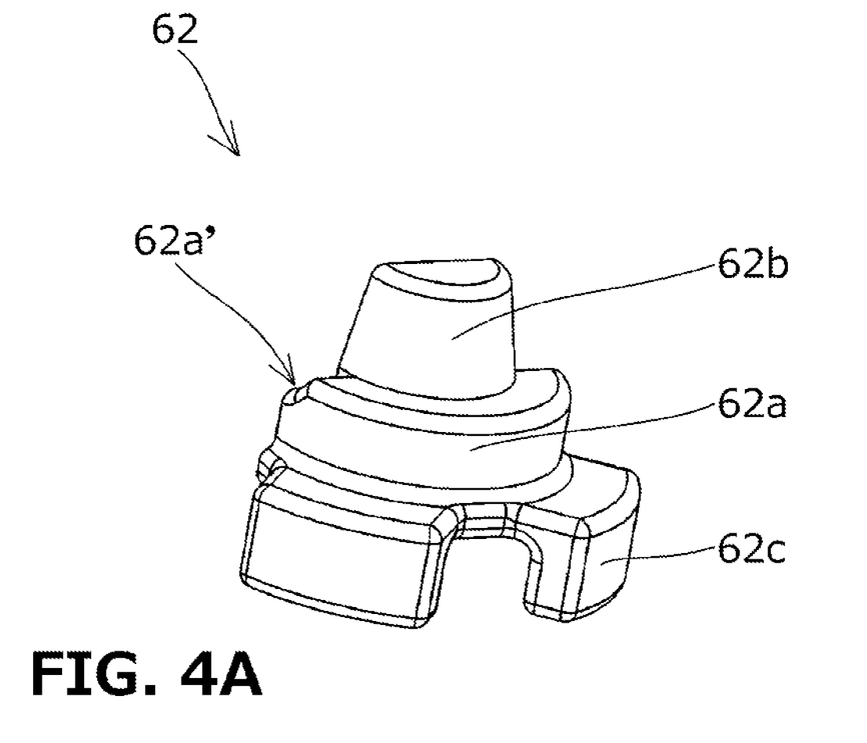
FIG. 4A is a cross-sectional perspective view illustrating a flow amount control member.
Figure 4B:
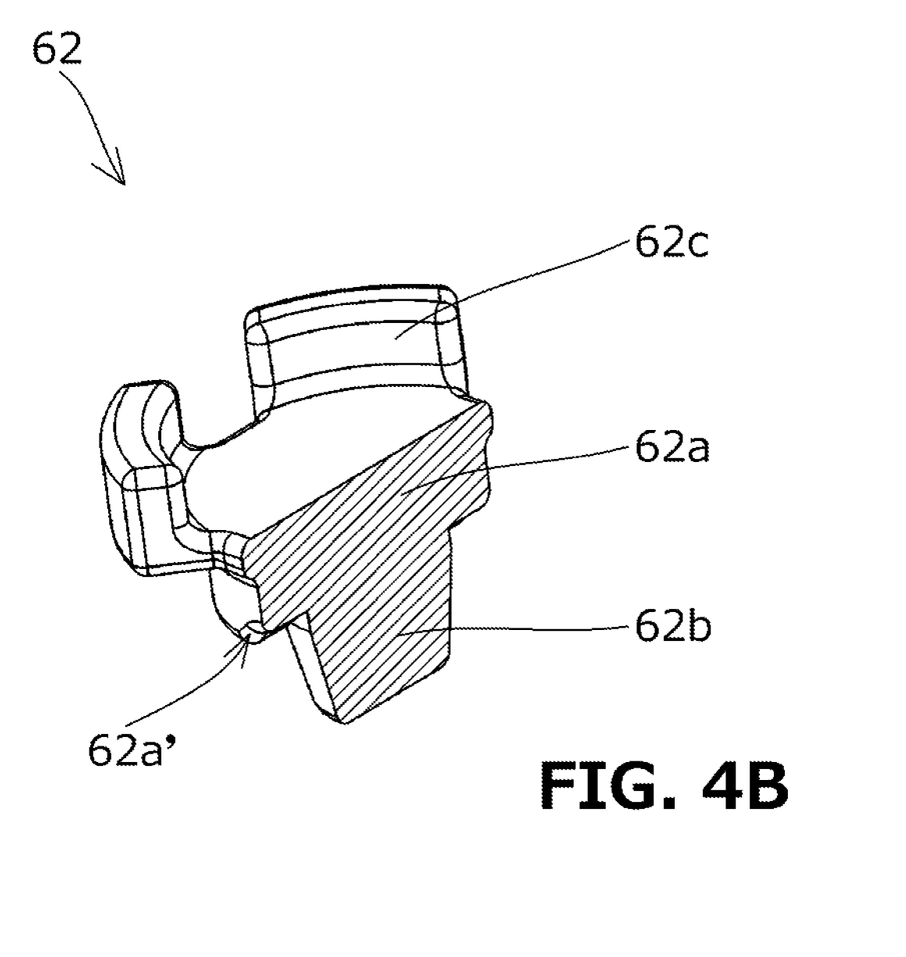
FIG. 4B is a cross-sectional perspective view illustrating the flow amount control member.

As shown in FIG. 3 and FIGS. 4A and 4B, the flow amount control member 62 is made up of a substantially columnar base part 62a, a small-diameter part 62b formed on a side of the base part 62a facing the oil pressure chamber 11 and having a smaller diameter than the base part 62a, and a large-diameter part 62c formed on a side of the base part 62a facing the oil supply passage 35 and having a larger diameter than the base part 62a. The base part 62a, small-diameter part 62b, and large-diameter part 62c are coaxial with each other.

Figure 6:
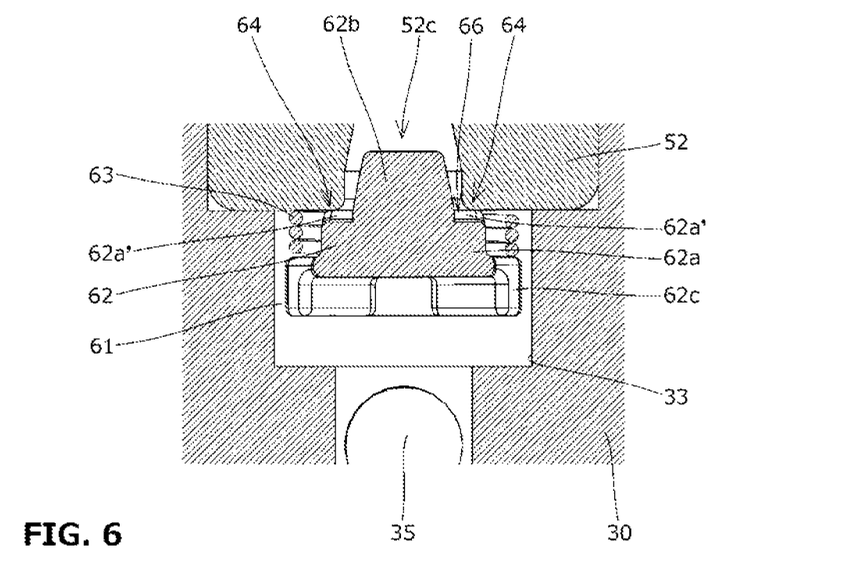
FIG. 6 is a cross-sectional view illustrating a state of the flow amount control mechanism when oil pressure rises.

A side face of the base part 62a on the side facing the oil pressure chamber 11 serves as a restricted surface that abuts on the first restricting part 64 as shown in FIG. 6 when the first restricting part 64 restricts the movement toward the oil pressure chamber 11.

A plurality of radially extending first communication grooves 62a' are formed in the side face of the base part 62a on the side (restricted surface) facing the oil pressure chamber 11 as shown in FIG. 3 and FIGS. 4A and 4B.

The small-diameter part 62b has a conical shape as shown in FIG. 3 and FIGS. 4A and 4B and protrudes from the side face of the base part 62a on the side (restricted surface) facing the oil pressure chamber 11.

This small-diameter part 62b enters into the oil hole 52c when, the first restricting part 64 restricts the movement toward the oil pressure chamber 11 as shown in FIG. 6.

The large-diameter part 62c is formed by a plurality of legs protruding from an outer circumferential surface of the base part 62a on the side facing the oil supply passage 35 as shown in FIG. 3 and FIGS. 4A and 4B. The plurality of legs are circumferentially spaced apart from each other. The large-diameter part 62c is designed to have an outer diameter that is slightly smaller than the inner diameter of the inner circumferential wall of the setting hole 33 that forms the control space 61.

The control spring 63 has one end set on the rear face of the check valve 50 (ball seat 52) and the other end set on the side face of the large-diameter part 62c on the side facing the oil pressure chamber 11 as shown in FIG. 2 and FIG. 3.

Figure 5:
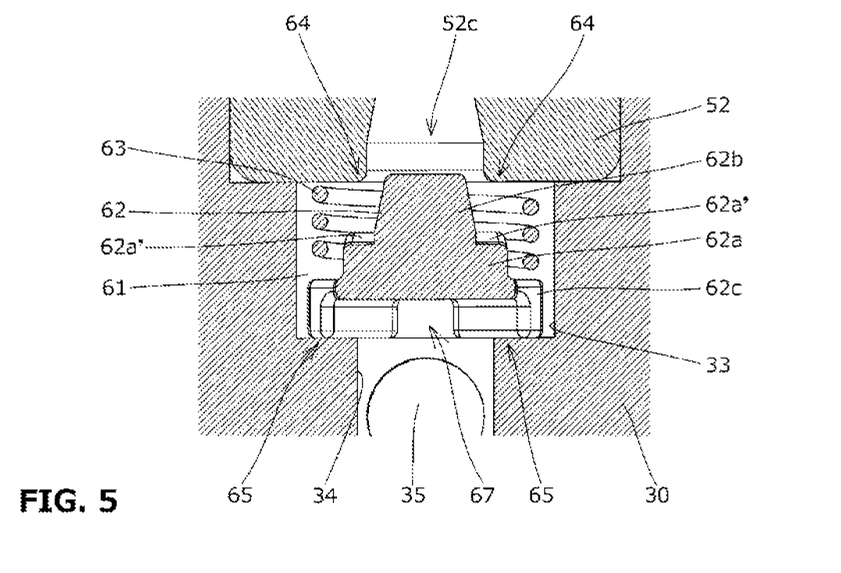
FIG. 5 is a cross-sectional view illustrating a state of the flow amount control mechanism in normal operation.

In normal operation of the tensioner 10 of this embodiment configured as described above, the flow amount control member 62 is first pressed rearward by the urging force of the control spring 63 so that the large-diameter part 62c of the flow amount control member 62 abuts on the second restricting part 65 as shown in FIG. 5.

In this state, there is formed a second control flow passage 67 between the flow amount control member 62 and the inner wall of the control space 61 for allowing the oil to flow between the oil supply passage 35 and the control space 61. More specifically, the oil flows from the oil supply passage 35 into the control space 61 through the gaps between the plurality of legs that form the large-diameter part 62c, and the oil that has entered the control space 61 is fed into the oil pressure chamber 11 through the check valve 50.

When the amount of oil supplied from the oil supply passage 35 increases (when the oil pressure rises), the flow amount control member 62 moves forward so that the side face of the base part 62a on the side facing the oil pressure chamber 11 (restricted surface) abuts on the first restricting part 64 as shown in FIG. 6.

In this state, there is formed a first control flow passage 66 between the flow amount control member 62 and the inner wall of the control space 61 for allowing the oil to flow between the control space 61 and the oil pressure chamber 11. More specifically, the oil is fed from the control space 61 toward the oil pressure chamber 11 through the first communication grooves 62a' formed on the side face of the base part 62a on the side facing the oil pressure chamber 11 (restricted surface), and through the gap between the oil hole 52c and the small-diameter part 62b.

Since the flow resistance of the first control flow passage 66 is set larger than the flow resistance of the second control flow passage 67, the amount of oil supplied to the oil pressure chamber 11, when the amount of oil being supplied from the oil supply passage 35 is increased, is kept small. As a result, an excessive supply of oil into the oil pressure chamber 11 can be avoided, while the amount of oil supplied to the oil pressure chamber 11 during normal operation is maintained.

Next, a tensioner 10 according to a second embodiment of the present invention will be described mainly with reference to FIGS. 7A and 7B. The second embodiment is the same as the previously described first embodiment apart from some parts of the flow amount control member 62, and therefore the configurations other than the differences will not be described.

The large-diameter part 62c of the flow amount control member 62 according to the first embodiment is formed by a plurality of legs as shown in FIGS. 4A and 4B. In the second embodiment, the large-diameter part 62c of the flow amount control member 62 is formed as a columnar portion as shown in FIGS. 7A and 7B.

Figure 7A:
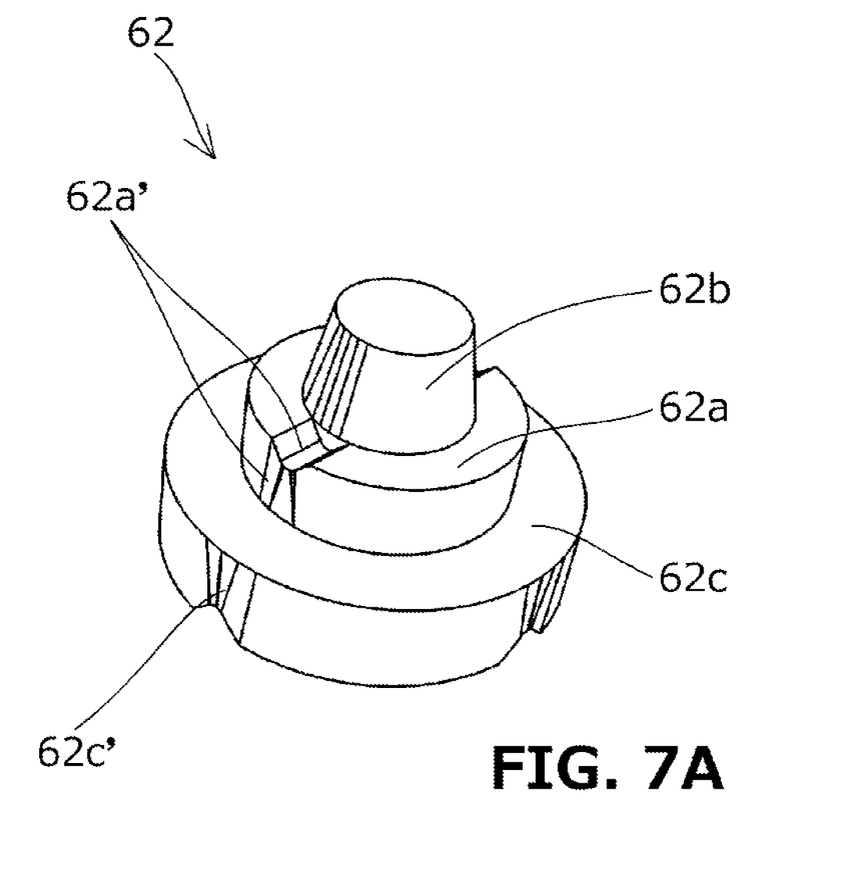
FIG. 7A is a perspective view illustrating a flow amount control member of a tensioner according to a second embodiment of the present invention.
Figure 7B:
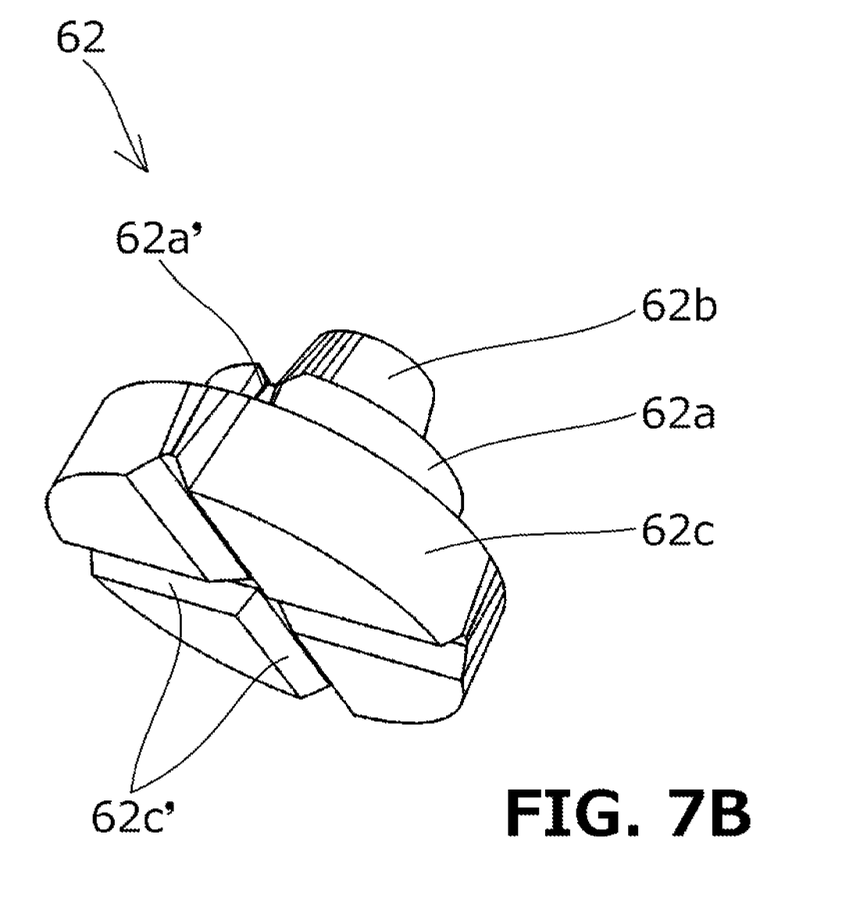
FIG. 7B is a perspective view illustrating the flow amount control member of the tensioner according to the second embodiment of the present invention.

The flow amount control member 62 according to the second embodiment has second communication grooves 62c' formed continuously on the side face of the large-diameter part 62c on the side facing the oil supply passage 35 and on the outer circumferential surface of the large-diameter part 62c as shown in FIGS. 7A and 7B. The second communication grooves 62c' formed on the side face of the large-diameter part 62c on the side facing the oil supply passage 35 extend along the radial direction, while the second communication grooves 62c' formed on the circumferential surface of the large-diameter part 62c extend along the front to back direction.

Therefore, when the flow amount control member 62 is pressed rearward by the urging force of the control spring 63 and the large-diameter part 62c of the flow amount control member 62 abuts on the second restricting part 65, the oil can flow between the oil supply passage 35 and the control space 61 through the second communication grooves 62c'.

The flow amount control member 62 according to the first embodiment has the first communication grooves 62a' only on the side face of the base part 62a on the side facing the oil pressure chamber 11 as shown in FIGS. 4A and 4B. In the flow amount control member 62 according to the second embodiment, as shown in FIGS. 7A and 7B, the first communication grooves 62a' are formed also on the outer circumferential surface of the base part 62a to extend in the front to back direction.

Namely, the flow amount control member 62 of the second embodiment has the first communication grooves 62a' formed on the side face of the base part 62a on the side facing the oil pressure chamber 11, and the first communication grooves 62a formed on the outer circumferential surface of the base part 62a, continuous with each other.

Therefore, the first communication grooves 62a' formed on the outer circumferential surface of the base part 62a also serve as guides for directing oil to the first communication grooves 62a' formed on the side face of the base part 62a on the side facing the oil pressure chamber 11.

While embodiments of the present invention have been described in detail, the present invention is not limited to the above-described embodiments and may be carried out with various design changes without departing from the scope of the present invention set forth in the claims.

For example, while the tensioner 10 was described as a component to be incorporated in a timing system of a car engine in the embodiments above, the purpose of use of the tensioner 10 is not limited to this specific application.

Also, while the tensioner 10 was described as a component that applies tension to a drive chain CH with a tensioner lever G in the embodiments above, the plunger 20 can directly guide the drive chain CH slidably with a distal end thereof to apply tension to the drive chain CH.

The application of the tensioner may not necessarily be limited to a transmission mechanism with a drive chain CH but can also be used for similar transmission mechanisms that use belts, ropes and the like, and can be applied in a variety of industrial fields where it is required to apply tension to an elongated component.

While the housing 30 accommodating the plunger 20 is described as the component known as a tensioner body that is attached to an engine block or the like in the embodiments described above, the housing 30 is not limited to the specific form described above and may be a cylindrical component known as a sleeve inserted into a body hole formed in the tensioner body.

While the first communication grooves 62a' formed on the side face of the base part 62a on the side facing the oil pressure chamber 11 (restricted surface) and the like are used as parts to configure the first control flow passage 66 in the embodiments described above, the first control flow passage 66 may be formed in any way as long as it allows the oil to flow between the control space 61 and the oil pressure chamber 11 when the flow amount control member 62 contacts the first restricting part 64. For example, grooves may be formed on the inner wall of the control space 61 and used as parts to configure the first control flow passage 66.

Similarly, the second control flow passage 67 may be formed in any way as long as it allows the oil to flow between the oil supply passage 35 and the control space 61 when the flow amount control member 62 contacts the second restricting part 65.

While the inner wall of the control space 61 is made up of the inner circumferential wall and rear end wall of the setting hole 33 in the housing 30 and a rear portion of the check valve 50 (ball seat 52) in the embodiments described above, the control space 61 may be formed in any way.

While the control space 61 is formed adjacent the check valve 50 on the rear side in the embodiments described above, the control space 61 may be provided anywhere else as long as it is at a position further toward the oil supply passage 35 than the check valve 50 (i.e., closer to the oil supply opening that opens in the outer face of the housing 30). For example, when an oil reservoir chamber (not shown) that reserves oil to be supplied to the oil pressure chamber 11 is provided inside the tensioner, the control space can be formed on one side, facing the oil supply passage 35, of the check valve 50, which is disposed between the oil pressure chamber 11 and the oil reservoir chamber.

What is claimed is:

1. A tensioner comprising: a plunger having a plunger hole that is open on a rear side; a housing having a plunger accommodating hole that is open on a front side for accommodating the plunger; a main biasing unit that is accommodated inside an oil pressure chamber formed between the plunger accommodating hole and a rear end of the plunger so as to be able to expand and contract and to urge the plunger toward the front side; an oil supply passage that supplies oil from outside the housing into the oil pressure chamber; a check valve that allows oil to flow from the oil supply passage into the oil pressure chamber and prevents the oil from flowing out from the oil pressure chamber to the oil supply passage; and a flow amount control mechanism set at a position further toward the oil supply passage than the check valve, wherein the flow amount control mechanism includes a flow amount control member set inside a control space formed at the position further toward the oil supply passage than the check valve so as to be able to approach and separate from the oil pressure chamber, a control biasing unit that urges the flow amount control member toward the oil supply passage, a first restricting part that restricts movement of the flow amount control member toward the oil pressure chamber, and a second restricting part that restricts movement of the flow amount control member toward the oil supply passage, when the flow amount control member contacts the first restricting part, a first control flow passage is formed between the flow amount control member and an inner wall of the control space so that the oil is allowed to flow between the control space and the oil pressure chamber, when the flow amount control member contacts the second restricting part, a second control flow passage is formed between the flow amount control member and the inner wall of the control space so that the oil is allowed to flow between the oil supply passage and the control space, the flow amount control member and the inner wall of the control space are provided such that the first control flow passage has a larger flow resistance than the second control flow passage, the flow amount control member has a restricted surface that abuts on the first restricting part when restricted by the first restricting part from moving toward the oil pressure chamber, the restricted surface has a first communication groove formed thereon, the first restricting part includes an oil hole that communicates with the oil pressure chamber, and the flow amount control member includes a small-diameter part protruded from the restricted surface to be inserted into the oil hole when restricted by the first restricting part from moving toward the oil pressure chamber.

2. The tensioner according to claim 1, wherein part of the inner wall of the control space is formed by the check valve.

3. The tensioner according to claim 1, wherein the flow amount control member includes a base part having the restricted surface, and a large-diameter part formed on the base part side facing the oil supply passage and having a larger diameter than the base part, the control biasing unit is formed as a control spring, and the control spring has one end set on a side face of the large-diameter part on a side facing the oil pressure chamber.

4. A tensioner comprising: a plunger having a plunger hole that is open on a rear side; a housing having a plunger accommodating hole that is open on a front side for accommodating the plunger; a main biasing unit that is accommodated inside an oil pressure chamber formed between the plunger accommodating hole and a rear end of the plunger so as to be able to expand and contract and to urge the plunger toward the front side; an oil supply passage that supplies oil from outside the housing into the oil pressure chamber; a check valve that allows oil to flow from the oil supply passage into the oil pressure chamber and prevents the oil from flowing out from the oil pressure chamber to the oil supply passage; and a flow amount control mechanism set at a position further toward the oil supply passage than the check valve, wherein the flow amount control mechanism includes a flow amount control member set inside a control space formed at the position further toward the oil supply passage than the check valve so as to be able to approach and separate from the oil pressure chamber, a control biasing unit that urges the flow amount control member toward the oil supply passage, a first restricting part that restricts movement of the flow amount control member toward the oil pressure chamber, and a second restricting part that restricts movement of the flow amount control member toward the oil supply passage, when the flow amount control member contacts the first restricting part, a first control flow passage is formed between the flow amount control member and an inner wall of the control space so that the oil is allowed to flow between the control space and the oil pressure chamber, when the flow amount control member contacts the second restricting part, a second control flow passage is formed between the flow amount control member and the inner wall of the control space so that the oil is allowed to flow between the oil supply passage and the control space, the flow amount control member and the inner wall of the control space are provided such that the first control flow passage has a larger flow resistance than the second control flow passage, the flow amount control member has a restricted surface that abuts on the first restricting part when restricted by the first restricting part from moving toward the oil pressure chamber, the restricted surface has a first communication groove formed thereon, the flow amount control member includes a base part having the restricted surface, and a large-diameter part formed on the base part side facing the oil supply passage and having a larger diameter than the base part, the control biasing unit is formed as a control spring, and the control spring has one end set on a side face of the large-diameter part on a side facing the oil pressure chamber.

* * * * *